United States Patent [19]

Manusch et al.

[11] Patent Number: 4,849,064

[45] Date of Patent: Jul. 18, 1989

[54] HAND-OPERATED DEVICE FOR TRANSFERRING A FILM FROM A CARRIER TAPE

[75] Inventors: Christoph Manusch, Hanover; Hans-Jürgen Harp, Hemmingen, both of Fed. Rep. of Germany; Roy van Swieten, Hertopenbosch, Netherlands

[73] Assignee: Pelikan Aktiengesellschaft, Hanover, Fed. Rep. of Germany

[21] Appl. No.: 181,940

[22] Filed: Apr. 15, 1988

[30] Foreign Application Priority Data

Oct. 27, 1987 [DE] Fed. Rep. of Germany ....... 3736357

[51] Int. Cl.[4] .............................................. B32B 35/00

[52] U.S. Cl. .................................... 156/577; 156/579; 156/584

[58] Field of Search ............... 156/577, 579, 584, 523, 156/527, 540

[56] References Cited

U.S. PATENT DOCUMENTS

| | | | |
|---|---|---|---|
| 3,955,711 | 5/1976 | Schröter | 156/579 |
| 3,969,181 | 7/1976 | Seabold | 156/579 |
| 4,096,022 | 6/1978 | Crawford | 156/579 |
| 4,112,536 | 9/1978 | Carson, Jr. et al. | 15/104.94 |
| 4,574,030 | 3/1986 | Pilcher | 156/584 |
| 4,576,311 | 3/1986 | Horton et al. | 156/584 |
| 4,718,971 | 1/1988 | Summers | 156/584 |

*Primary Examiner*—Michael Wityshyn
*Attorney, Agent, or Firm*—Herbert Dubno

[57] ABSTRACT

A hand-operated device for transferring a film from a carrier tape to a substrate has a housing made up of two parts connected by a swivelable linkage. The housing has two rotatable pivot pins coupled to each other by a clutch coupling. A cartridge is held in position in this housing by a suitable arrangement of pins and receptacles. This cartridge has, conrotatably linkable to the pivot pins, a feed reel and a wind-up reel for the tape, and has an applicator element at one end over which the tape runs and which is used to press the tape against the substrate for transfer of the film.

20 Claims, 3 Drawing Sheets

HAND-OPERATED DEVICE FOR TRANSFERRING A FILM FROM A CARRIER TAPE

CROSS REFERENCE TO RELATED APPLICATION

This application is related to the commonly owned copending application Ser. No. 07/181,779 filed concurrently herewith, based upon German application P 37 363 67.0 of Oct. 27, 1987.)

FIELD OF THE INVENTION

Our invention relates to a hand-operated device for transferring a film from a carrier tape to a substrate such as paper.

BACKGROUND OF THE INVENTION

Hand-operated devices such as hand rollers and adhesive rollers are known for transferring a film from a carrier tape onto a substrate. Such tools are found useful in offices, for example, for transferring an adhesive film from a carrier tape onto paper for the purpose of attaching sheets together. In this manner, a very clean and precise application of the adhesive layer can be accomplished. However, these hand rollers rapidly gather dust when not in use, and they also have problems with an adhesive fluid drying on.

There is a type of hand roller already on the market having a transferrable adhesive film on a carrier tape with a feed reel for the tape and a wind-up reel which are kept in a two-piece housing. To change both reels, the two pieces of the housing are taken apart, then the two reels are taken off their two pivot pins and the new reels placed thereon. In the housing, there is also a diagonally protruding applicator element for pressing the tape against the substrate. This applicator element has the form of a swivelable lever pressed up by a spring located in the housing. When the user wishes to change the tape, the tape coming from the feed reel must be threaded over the free end of this lever and then led back to the wind-up reel in the housing. The feed reel and the wind-up reel are coupled with one another by a clutch coupling. At the end of this applicator lever there is a relatively large round transverse bolt or pivot, over which the tape is bent, and this bolt extends sufficiently far beyond the lever holding it that when (during use of the tool) it is pushed out of its rest position against the spring pressure, it can move against the spring sufficiently far as to hit the housing.

This known type of hand-operated device has the disadvantage that in changing the reels, both reels must be individually placed on the pivot pins and moreover the tape between the two reels must be manually threaded over the applicator element which protrudes from the housing. This demands considerable care and skill, and has the risk that the hands of the person doing the changing of the reels will become dirty, also that the the working parts of the apparatus (for instance the drive or coupling) will also become dirty, this perhaps resulting in malfunction or even failure of the apparatus.

OBJECTS OF THE INVENTION

It is an object of our invention to provide a hand-operated device for applying a film from a carrier tape onto a substrate, of a substantially improved type such that the reel change is simplified and can be carried out easily and quickly by an unskilled person, and such that the risk of dirtying the hands of the user and dirtying the working parts of the tool are obviated.

It is a further object to provide such a hand-operated device that permits high pressure to be exerted on the substrate by the applicator bar without stressing the tool or creating difficulty for the user.

It is a further object to provide such a tool in which tape movement is facilitated without risk of backlash. Other objects will be made evident hereinafter.

SUMMARY OF THE INVENTION

In accordance with the invention, the objects are met a hand-operated device for transferring a film from a carrier tape to a substrate which has a housing made up of at least two parts (generally two main parts) with a swivel bolt linking them together, so that the housing can be opened and closed by a swivel motion.

The housing has two pivot pins located in a fixed position inside the housing, and these pivot pins serve as sites for two rotatable reels, namely a feed reel for the tape and a wind-up reel for the tape.

These reels are coupled together operatively, at least when on their pivot pins, by a mechanical coupling, particularly a gear and clutch coupling.

Protruding from the end of the housing there is an applicator member, over the end of which the tape is run subsequent to its leaving the feed reel and prior to its being rewound on the wind-up reel.

When the tool is in use, this applicator member serves to press the tape against the substrata so as to effect the transfer of the film from the tape to the substrata. The applicator member is deflectable in the manner of a spring, within a limited range of deflection, when downward pressure is applied to the housing by the user of the tool.

It is a feature of the present invention that the feed reel and the wind-up reel, as well as the applicator member, are contained in a replaceable cartridge fitting into the housing. When the cartridge is placed in the housing, the pivot pins on the interior of the housing penetrate apertures in the reels so as to serve as driving means for the reels.

The cartridge also has a fixed securing receptacle with a securing aperture in it. The housing has a centering and supporting pin immovably attached to the housing wall facing the cartridge when the cartridge is installed and this pin penetrates the securing aperture when the cartridge is installed.

The cartridge furthermore has securing means (such as an aperture or slot for penetration of a securing pin from the housing) for preventing its rotation under the torque caused by the pressure applied by the user.

The hand roller of this invention makes possible an extraordinarily fast and trouble-free change of the reels, since it is only necessary to open the housing and take out the cartridge and replace it with a new cartridge. For this purpose, only two simple hand motions, requiring no skill, are needed to lift out the old cartridge and set in the new cartridge.

Since the cartridge contains both reels and the applicator element, the need for threading the tape over the applicator element and back to the wind-up reel is already provided for in the replacement cartridge, and no threading or special handling of the tape is needed.

Because of the presence of the centering and supporting pin, and a corresponding mounting receptacle for it in the cartridge, this arrangement assures that the cartridge will be placed in exactly the right position, so that no difficulties occur in connection with cartridge changes.

In the hand-operated device of the invention, by having the centering and supporting pin, which holds the cartridge with respect to the housing and which bears the force between the cartridge and the housing, located near the elastically-deflectable application element, this configuration assures that pressure applied by the user onto the housing is effectively transmitted by way of this centering and supporting pin to the application element and thence exerted against the substrate.

The requisite lever arm and pressure transmission pathway are very small so that the torque on the cartridge (in the sense of a rotational moment about the centering and supporting pin) is relatively small also. This torque can be resisted, in accordance with the invention, by additional rigidifying securing means. One advantageous means for accomplishing this is the provision of a circularly unsymmetrical cross section for the centering and supporting pin and for the corresponding aperture in the mounting receptacle for this pin. For this purpose, a toothed seat between this pin and its mounting receptacle, or a polygonal cross section are especially suitable.

An alternative preferred arrangement is for the centering and supporting pin to have a circular cross section and to also have a slot on the side wall of the cartridge facing the housing when the cartridge is laid in, and at as great a distance from this pin as possible. This slot should run transversely to the direction of the turning torque of the cartridge around the centering and supporting pin.

When the cartridge is in the housing, a securing pin of matching circular cross section, this pin being a protrusion from the region of the housing matching the position of the slot, penetrates this slot. In this configuration, the securing of the cartridge against rotational torque is separate from the support at the first centering and supporting pin; this is an effective arrangement and it has the further advantage that easily-made circular cross section pins can be used, and the corresponding circular aperture in the receptacle is easily made as well.

Moreover, by having the rotation-resisting securing pin offset to a large distance, a large degree of leverage is achieved and only a small force is required to give the requisite resistance. Even more preferred is to have the rotation-preventing securing means located at the far end of the cartridge.

The aforementioned advantages of the hand roller in accordance with the present invention are particularly satisfactorily achieved in another preferred embodiment wherein the mounting receptacle for the centering and supporting pin has a protrusion (detent) directly attached to it, against which the deflectable applicator element impacts when the tool is used. In this way, pressure applied to the tool is conducted directly to the vicinity of the intended pressure point between the applicator element and the substrate. Or in other words, the forces exerted on the applicator bar are conducted by a short pathway into the cartridge and right to the place where the mounting receptacle for the centering and supporting pin provides a local transverse strengthening of the cartridge. It is distinctly advantageous to have the forces in the cartridge transmitted by way of this rigid member (the mounting receptacle).

It is especially preferred, moreover, to have the centering and supporting pin, and/or the circular rotation-preventing securing pin conically beveled at their extremities, by which means the insertion of these pins into their corresponding apertures is facilitated.

Another preferred embodiment of the hand-operated device of the invention is one in which the feed reel and the wind-up reel in the cartridge are not rigidly fixed in position, but are positioned in a "swimming" manner, i.e. with "play", that is to say, their relative position inside the cartridge is shiftable to a small and delimited extent, in such a way that their exact position is not determined until the cartridge is placed in the housing and the pivots (which themselves are firmly affixed to the housing) are firmly positioned in the corresponding apertures in the reels.

Since these pivot pins are firmly affixed to the housing, it is desirable, in view of the similarly firmly-affixed position of the centering and supporting pin, to avoid any stressed condition which might otherwise occur in the cartridge, conversely it is desirable to assure a firm fit without need for bracing. The arrangement just described facilitiates the movements involved in fitting the cartridge into the housing.

It is alternatively useful to have the reels firmly fixed in the cartridge but to have the rotational coupling between the pivot pins and the apertures in the reels provided with an equalizing or stress-relieving means. This can be accomplished by having the pivot pins shaped in the form of tappet bolts which fit a correspondingly shaped aperture in the reel into which the tappet bolt fits, with a certain stress-equalizing tolerance of fit being provided between each tappet bolt and the aperture of each reel.

In a further advantageous feature of the hand-operated device of the invention, the cartridge is provided with a detent means for preventing the reverse rotation (backlash) of the wind-up reel. This detent means is in the form of a spring-like lip built onto the side wall of the cartridge and arranged to engage with a toothed rim suitably located on the reel, so as to prevent any undesirable unwinding motion of the wind-up reel.

It is especially preferred to have the clutch coupled drive linkage between the two pivot pins located in the housing outside of the cartridge, since in this way this mechanism can be left in place in the housing when the cartridge is changed. It is less desirable to have it in the cartridge because this requires that it be changed when the cartridge is changed.

It is highly preferred to locate the drive linkage with its clutch coupling in a covered space in the housing, the cover being on the side facing the cartridge, with both pivot pins protruding through this cover in the direction of the cartridge. In this way, contamination of the crucial drive mechanism by dirt during the cartridge changes can be greatly lessened, and thus the long-term performance of the tool can be better maintained.

For construction of the hand-operated device of the invention, it is especially preferred that the housing be made out of two sides, swivelable with respect to one another around a pivot which is at one end of the housing and which links the two sides together, this swiveling feature providing means for inserting and removing the cartridge. The side, or part, of the housing into which the cartridge is laid has constructed on it the two pivot pins as well as the centering and supporting pin and the securing means for preventing rotation of the cartridge. In this way, the housing is easy to open, easy to close, and convenient to handle, and unlike some of the previously known tools of this general type, it does not present the danger of having the two parts detach and fall apart, since both parts are linked by the pivot and remain linked even when the housing is opened.

In this regard, it is also preferred to have means for securing the two housing parts in the closed position. An especially preferred means is constructed in the form of a latching lever, which is designed such that it can be readily unlatched by the user when a cartridge change is to be carried out, while securely latching the shut housing until manually unlatcheed.

Another possible embodiment for this feature is to have a swivelable lever which is constructed as a latching lever which, when it is the closed position, holds the two sides of the housing together. This latching lever can be swivelable around the same pivot as the two sides of the housing, but it is preferable that when it swivels into the closed position it forces the two housing parts to be in their closed position.

An especially preferred feature is to have the cartridge provided with means for preventing the tape from moving except when the cartridge is in the housing, so that the carrier tape can only move and the film can only be transferred when the cartridge is placed in the hand-operated device. A number of means to provide this feature are possible, which will be evident to those skilled in the art, differing in the location at which the blockage of tape movement is effected. An especially preferred arrangement has the rotation of the feed and wind-up reels regulated.

A further preferred embodiment of the hand roller of the invention consists of having the applicator element constructed with a thin elongated elastically-bendable support member.

The hand-operated device of the invention is easy to use. It makes possible an especially simple and rapid change of the cartridge, and facilitates the application of substantial pressure between the applicator element and the substrate, since the arrangement of parts in accordance with the invention facilitates the transmission of force from housing to cartridge to application element by a short path. This feature also favors the functioning of the mechanism in the changeable cartridge. This is especially important when it is necessary to work with higher pressures for transferring the film from the carrier tape to the substrate.

The hand-operated device in accordance with the invention can be used for such applications where high pressure is needed. Thus, for instance, the hand-operated device of the invention can be used for the application of cover films (blanking-out films which supply the visual equivalent of an erasure) from a tape to a substrate where typewritten material on a sheet is to be covered. Since the typewriter when it strikes the paper creates local depressions corresponding to the shape of the typed letter, it is essential to use rather strong pressure to apply a cover film especially over these depressions at the typed letters, thus necessitating locally increased pressure.

BRIEF DESCRIPTION OF THE DRAWING

The above and other objects, features and advantages of the present invention will become more readily apparent from the following description, reference being made to the accompanying diagrammatic drawing in which.

SPECIFIC DESCRIPTION

Figure 1:
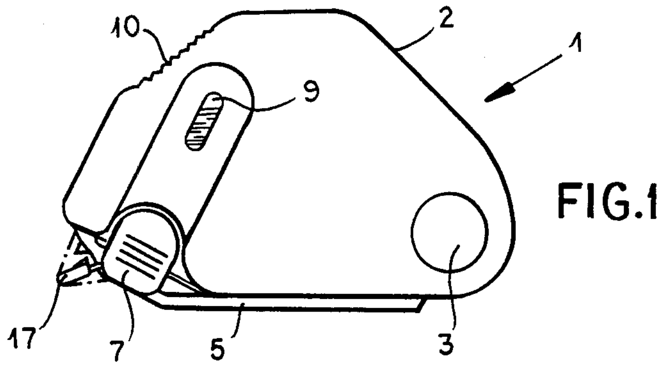
FIG. 1 is a diagrammatic side view of a hand-operated device (hand roller) in conformity with the invention, having an inserted replaceable cartridge ready for use.
Figure 3:
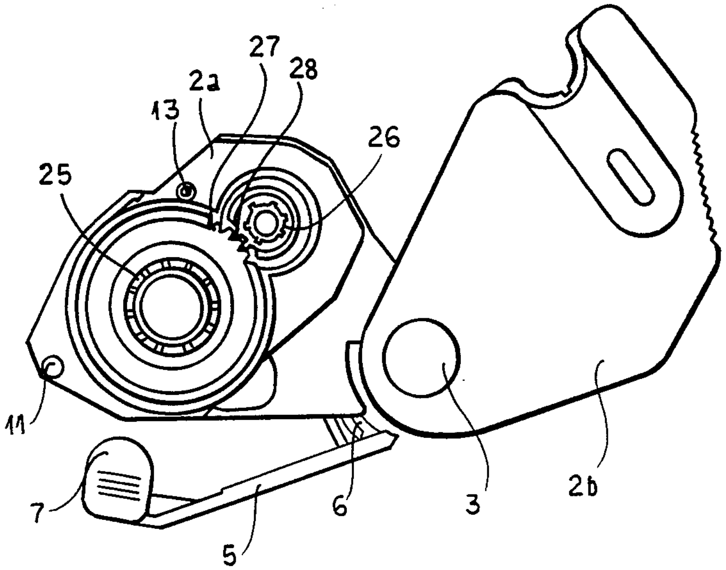
FIG. 3 shows the same hand-operated device but after removal of the replaceable cartridge.
Figure 2:
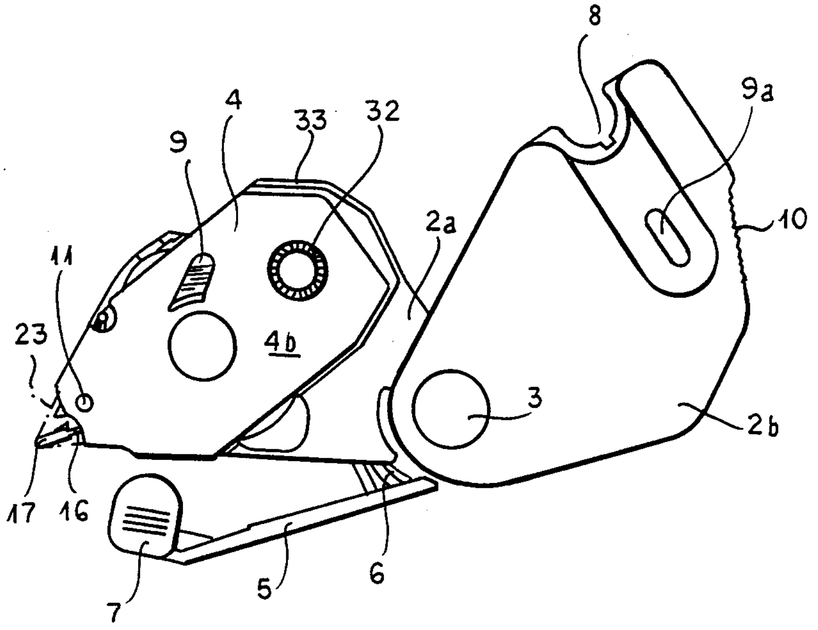
FIG. 2 shows the hand-operated device of FIG. 1 but in opened-out state with an inserted replaceable cartridge.

The hand-operated device 1 shown in FIGS. 1 to 3 has a housing 2, which comprises two housing parts 2a and 2b, which are swivelable with respect to each other around a pivot 3 provided at one end of housing parts 2a and 2b. The pivot 3 is constructed so that it holds the housing parts 2a and 2b together even when they are in the opened-out position.

On the housing 2, also swivelable around the pivot 3 there is provided a holding lever 5, which however is not directly attached at its end to the pivot 3, but rather is attached to a retaining flange 6, which in turn is a circular segment concentric with the pivot 3 and extending over a certain circular arc, and having only a radially-extended linkage with the pivot 3 (this is not shown in the Figure).

The lever 5 is provided on its free end with two parallel gripping surfaces 7, which, when the housing is closed, insert into corresponding cut-out spaces 8 in each of the housing side parts 2a and 2b.

When the hand-operated device of FIG. 1 is opened, the user first takes hold of the housing 2 with one hand and then takes hold of both gripping surfaces 7 of the locking lever 5 and pulls it down with the other hand, to the position shown in FIG. 2 and 3. In this way, both housing parts 2a and 2b are suitably swiveled apart with respect to one another as is shown in FIGS. 2 and 3, so that the replaceable cartridge 4 held in housing part 2a becomes fully accessible.

Figure 4:
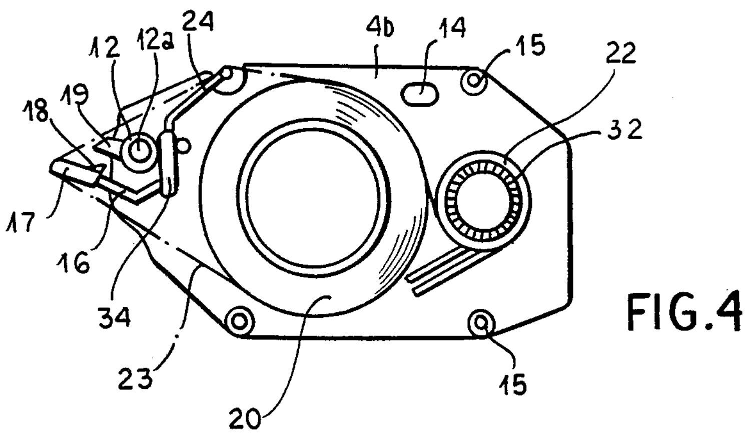
FIG. 4 is a diagrammatic view of the replaceable cartridge shown in the housing in FIG. 2 but with the side plate of the cartridge removed.

As shown in FIGS. 2 to 5, the replaceable cartridge 4 has on one end a diagonally-outward protruding application element 16, which has on its free end a strengthened application bar 17, around which passes the tape path of the carrier tape 23, which carries the film to be transferred to the substrate, the tape 23 then being led back into the cartridge to the wind-up reel 22 (see FIG. 4).

As can be seen from the view in FIG. 1 of the closed hand roller, the housing 2 (as well as the component housing parts 2a and 2b) has, at the corner where the application element 16 of the installed cartridge is located, an opening so that when the cartridge 4 is installed, the applicator element 16 with its applicator bar 17 protrudes diagonally from the housing 2. In this way, it becomes possible, when the cartridge 4 is installed and the housing 2 is closed, for carrier tape 23 to be pressed against the substrate when the user presses down on the gripping surface 10 on the top of the housing 2, then bringing about the desired transfer of the film by moving the housing 2 relative to the substrate.

The cartridge 4, as shown in FIG. 2, is placed or laid into a housing part 2*a*, which has a conforming depression or receptacle space matching the thickness of the cartridge. The cartridge 4 when installed, is covered on its outer periphery by a extensively circumferential wall 33 (see FIG. 2), which in the embodiment shown is only interrupted in the region of the gripping surface 10; in this regard, on the other housing part 2*b* there is provided an additional covering wall (not shown in the figures) which is built out from the housing part 2*b* and which, when the housing is closed, also substantially covers the periphery of the cartridge.

Thus, when the housing 2 is closed, in the region containing the cartridge, the outer periphery of the cartridge is completely covered (except for the region of the housing at which the applicator element 16 protrudes). The configuration of the edge of the housing part 2*a* serves not only for covering the outer periphery of the cartridge 4 (which is also covered by the edge of the other housing part 2*b*) but also serves to give rigidity to the housing part 2*a*.

On the cartridge 4, there is provided a window 9 which matches up with a corresponding window 9*a* in the other housing part 2*b*, as shown in FIG. 1; this makes it possible to ascertain how much tape supply remains on the feed reel 20 in the cartridge 4.

Figure 5:
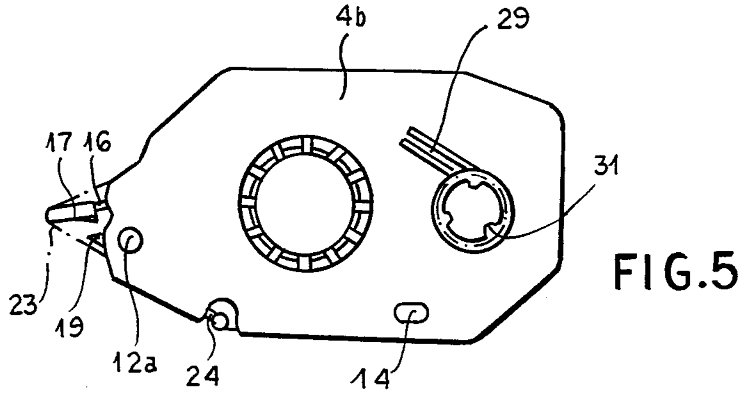
FIG. 5 is a view of the cartridge of FIG. 4 but from the reverse side.

The cartridge 4 comprises two cartridge side plates 4*a* and 4*b* (FIG. 2 as well as 4 and 5); they are depicted in FIG. 4 which shows the installed cartridge with the front side plate 4*a* removed, and in FIG. 5 which shows the same cartridge from the back.

As FIG. 4 shows, the cartridge contains the feed reel 20 and the wind-up reel 22, where the feed reel 20 is arranged between the applicator element 16 and the wind-up reel 22. Proceeding from the feed reel 20, the carrier tape 23 is conveyed, with its outer side having the film which is to be transferred, to the stiffened applicator bar 17 at the front end of the applicator element 16, then around the bend, then over a interposed tensioning lever 24 and then, after contacting the upper part of the feed reel 20, back to the wind-up reel 22. Having the carrier tape 23 contact the outer surface of the feel reel 20 on its way to the wind-up reel 22, is deliberately done where the carrier tape carries an adhesive film, because then by means of the undwinding movement of the feed reel 20 on account of the adhesive film, the sticking of the underside of the carrier film as it is led to the wind-up reel 22 gives an effective pull in the unwinding direction.

The applicator element 16, as shown in FIG. 4, is configured as a thin lever with a knee, and is made of an elastic material, for example a suitable plastic or spring steel.

On its free end, as already mentioned, there is mounted a stiff, substantially thicker, applicator bar 17, which is provided, on the side facing the housing 2 in the spring deflection direction, with a cam or protrusion 18. This cam 18 is arranged to correspond with a protrusion or detent 19 which is fixed firmly on a mounting receptacle 12 which is firmly affixed to the cartridge housing, this mounting receptacle 12 being built out, preferably as a single piece, as a support tube which extends across the cartridge between both side pieces 4*a* and 4*b*.

This mounting receptacle (support tube) 12 has in its interior an aperture 12*a* which extends through the side plates 4*a* and 4*b*; when the cartridge 4 is laid in the housing part 2*a*, a centering and supporting pin 11 which extends out at this point from the housing part 2*a* penetrates into this aperture 12*a* (see FIG. 3). By this means, when the cartridge is laid into the housing part 2*a*, it is held in place with respect to the housing part 2*a*.

In the embodiment shown in the Figures, there is in the side plate 4*b* of the cartridge 4, which faces toward the housing side plate 2*a*, a slot 14 at a relatively long distance from the aperture 12*a*; into this slot penetrates a transverse pin 13 which extends from the housing part 2*a*; when the tool is used, this pin opposes the torque which is exerted on the cartridge 4 in the sense of a force tending to cause rotation around the supporting and centering pin 11. The position of the slot 14 is chosen so that its long axis is across the direction of motion caused at this point by the torque about the pivot 11. "Across" in this sense does not mean that at this point an exact right angle must be present (although this may be the selected configuration) but rather, the cross position must only provide that the slot arrangement does not allow any undesirable swiveling motion.

In this connection, it is advantageous that the slot 14 be located as far as possible from the centering and supporting pin 11, in order to keep the restoring force as small as possible around the pivot 14 when torque is applied to the cartridge 4.

The cartridge 4 can be constructed so as to be closed along its periphery between the side plates 4*a* and 4*b*, with the exception of the front end aperture through which the applicator element 16 with its applicator bar 17 extends. However, such a closed construction is not absolutely required.

In the embodiment shown in the drawing, the side walls 4*a* and 4*b* of the cartridge 4 are only attached to one another at their transverse attachment posts 15 as well as, of course, at the transverse attachment mounting receptacle 12. The mounting receptacle 12 with its attached detent 19 is placed in close proximity to the foot of the applicator element 16, so that that upon elastic deflection of the latter, only a small deflection path exists between the protrusion 18 on the applicator bar 17 and its detent 19. Thereby, the protrusion 18 which encounters its detent 19 when the deflection takes place, is placed as near as possible to the rounded forward edge (pressure-applying edge) of the applicator bar 17, in order that the pressure applied to the tool by the user during use of the tool is transmitted to a point as near to the pressure-applying edge of the applicator bar as possible. Hence, only a relatively small effective lever arm is provided for the applicator element 16 and applicator bar 17. The mounting receptacle 12 and the detent 19 built out from it are made as stiff as possible, so that the pressure applied by the user is transmitted from the housing by way of the centering pin 11 in the holding socket 12 as easily as possible and by the shortest possible path to the pressure-applying point of the applicator bar 17.

In this way, relatively large pressures can be transmitted without requiring especially large dimensions for the applicator element 16 or the stiff applicator bar 17. The applicator element 16 terminates at its base end, in the housing, in a massive part 34 which is arranged in a fixed and nonrotatable position between the side walls 4*a* and 4*b* of the cartridge 4, attached thereto.

In the range available to it, the applicator element 16 can bend elastically toward the detent 19 relative to the side walls 4*a* and 4*b* of the cartridge 4. By means of this bending, when the apparatus is put into use, the tape path of the carrier tape 23 between the pressure-applying edge of the applicator bar 17 and the tensioning lever 24 is relaxed to a substantial degree of slack (since the tensioning lever 24 has only a very slight degree of spring motion in regard to compensating for tension variations).

This results in an improved initial state for the winding up action of the carrier tape 23 and for the winding up on the wind-up real 22.

Figure 6:
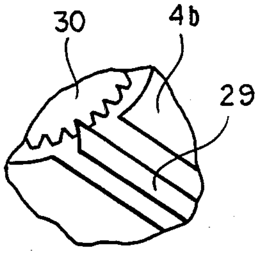
FIG. 6 is an enlarged detailed diagrammatic view of the backlash detent in the cartridge.

The wind-up reel 22 has, on its end which faces toward the housing part 2*a*, a toothed gear arrangement 30 (FIG. 6) into which a spring-like lip, built out from the side wall 4*b* of the cartridge 4, penetrates. The penetrating end of the spring-like lip 29 is cut at an angle such that the wind-up reel 22 can only turn in the wind-up direction (permitted by the elastic deflection of the spring 29) while it is blocked from turning in the other direction.

On the other end of the wind-up reel 22 there is a circular ridging 32 which penetrates through a corresponding opening in the side plate 4*a* of the cartridge 4 and offers the user a means for manually turning from outside the cartridge the wind-up reel 22.

In the side plate 4*b* of the cartridge 4, which faces the housing part 2*a*, in the region of the central opening of the feed reel 20 and the wind-up reel 22 corresponding openings are provided through which pivot pins 25 and 26, projecting from the housing part 2*a* into the cartridge, are able to penetrate into the central apertures of the reels 20 and 22, so that they make an effective link for causing them to turn in the driving direction.

As can be seen in FIG. 3, the pivot pins 25 and 26, are linked operatively with each other by gear wheels 27 and 28 which are preferably covered, on the side toward the cartridge, by a suitable cover plate. In this regard, moreover, the pivot pin 25 which relates to the feed reel 20 is integrated into the toothed gear arrangement of a clutch coupling, which is able to compensate for any turn number difference between the wind-up reel 22 and the feed reel 20 as the carrier tape is being wound up. In regard to the toothed arrangement of the clutch coupling, FIG. 3 shows it only half shaded in for the sake of better visibility.

The covering of the drive mechanisms 27 and 28 and the associated clutch coupling by a cover plate in the direction facing the inserted cartridge is done so that the pivot pins 25 and 26 protrude and providing an adequate cover such the entire drive mechanism including its associated clutch coupling, is in a space within the housing 2 separate from the space which holds the cartridge 4. This arrangement, on opening the housing, gives a neater appearance. For purposes of better visibility in the Figure, the cover plate is not shown in FIG. 3, however its introduction will not be a problem to one skilled in the art.

The pivot pins 25 and 26 are depicted in the example shown in FIG. 3 as tappet bolts, which function to drive both reels 20 and 22 by virtue of their fit into corresponding apertures (for example 31 in FIG. 5) without the necessity of exact tight fit between the pivot pins and the apertures of the corresponding reels. In this way, it is assured that even with a small relative displacement between the center points of the pivot pins 25 and 26 and the center points of the apertures of the respective reels 20 and 22, a reliable driving linkage will still be achieved. This is important, if, as shown in the Figures, the position of the reels 20 and 22 within the cartridge 4 is fixed, to avoid possible forcing conditions which might otherwise occur as the position is further rigidified by the securing pin 11. In this connection, there is an alternative possibility to allow the reels 20 and 22 to "swim" within the housing, that it to say, to allow them to have some sideways "play" which makes it possible to have exactly positioning pivot pins 25 and 26 inserted into them, since any difference which may occur between the position of the center point of the reel and the corresponding pivot pin can be compensated for by a offsetting movement of the reel.

Preferably the cartridge also is provided with a regulatory means (not shown in the Figures) which makes it possible to prevent the turning movement of the wind-up reel 20 if the cartridge 4 is not inserted into the housing 2. This can be accomplished, for instance, by providing an arresting tongue in the side plate 4*a* of the cartridge 4 facing the housing part 2*a*. This tongue penetrates into a radial tooth arrangement on the end of the feed spool 20 in a rotation-blocking fashion, until the cartridge is put into the housing, whereupon a protruding pin from the housing forces the tongue sideways out of the tooth arrangement on the reel, thus removing the blockage. Another means is to have the same function performed by the end face of the pivot pin 25, with a blocking tongue extending into the same aperture as the pivot pin.

The cartridge itself is advantageously made of a suitable plastic, whereby it can be used as a disposable cartridge, or as a cartridge which can be replenished with a new reel of tape. In the latter case, it is provided that both side parts 4*a* and 4*b* can be opened up after taking out the cartridge, so that the cartridge has the form shown in FIG. 4, where the reels can be removed by hand and replaced by new reels, then the cartridge reassembled and then put back into a suitable hand roller ready for use again.

In order to be able to use the hand roller shown in the drawings, it is first necessary to load the replaceable cartridge 4. For this purpose, the closed housing 2 (in which for example no cartridge is present) is opened by grasping the locking lever 5 and then swiveling apart the two housing parts 2*a* and 2*b* to the open position shown in FIG. 3.

Then the cartridge 4 is laid into the housing part 2*a* by the user, in the manner described and illustrated, and then the housing parts 2*a* and 2*b* are placed atop one another and clamped together by closing the locking lever 5.

The now-ready device, which has the applicator element 16 and applicator bar protruding from the housing 2 is next placed against the substrate onto which the film from the carrier tape 23 in the cartridge 4 is to be transferred, then by pressure the application element 16 is elastically deflected until the projection 18 hits the detent 19 and hereafter the film is transferred to the substrate by moving the apparatus with respect thereto.

At the same time, the carrier tape 23 is unwound from the feed reel 20 and wound up at the wind-up reel 22. At the end of the transfer process, the apparatus is taken up from the substrate, whereby the applicator element 16 goes back to its starting position.

If the cartridge 4 is to be exchanged for another cartridge (perhaps because the tape supply of the feed reel has run out or a cartridge with another feed tape and film is to be used), the housing 2 of the hand-operated device 1 is opened in the same way, as described above whereby a condition is reached as shown in FIG. 2. The cartridge initially present is removed and the desired new cartridge is put in, then the apparatus is closed to the ready state, and is ready for use again.

We claim:

1. A hand-operated device for transferring a film from a carrier tape to a substrate which comprises:

a housing comprising at least two housing parts;

a swivel bolt linking said housing parts swivelably together;

two pivot pins fixed in said housing;

a feed reel for said tape and a windup reel for said tape rotatably located on said pivot pins in said housing;

a clutch coupling operatively linking the rotation of said reels;

an applicator member protruding from said housing, said tape running over said applicator member which is configured so as to press said tape against said substrate to transfer said film to said substrate, said tape thereafter running to said windup reel;

said applicator member being deflectable in the manner of a spring when downward pressure is applied to said housing;

said feed reel and said windup reel being contained in a replaceable cartridge fitting into said housing; said applicator member being mounted in one end of said cartridge;

said cartridge having a fixed securing receptacle defining a securing aperture;

a centering and supporting pin immovably attached to said housing and adapted to fit said securing aperture on said cartridge when said cartridge is placed in said housing; and securing means for prevention of rotation of said cartridge around said centering and supporting pin.

2. A hand-operated device as defined in claim 1 wherein a detent is attached to said securing receptacle, said detent serving to limit the movement of said applicator member in deflection of the applicator member under pressure.

3. A hand-operated device as defined in claim 1 wherein said centering and supporting pin and said securing aperture are configured so as to provide said means for prevention of rotation of said cartridge.

4. A hand-operated device as defined in claim 1 wherein said centering and supporting pin and said securing aperture of said securing receptacle have a circularly unsymmetrical cross section.

5. A hand-operated device as defined in claim 1 wherein said centering and supporting pin and said securing aperture have a circular cross section and where said cartridge has, on its side wall facing said housing part in which said cartridge is placed and at a distance from said securing aperture, a slot and where said housing has a matching protrusion fitting said slot as securing means to prevent rotation of said cartridge in said housing.

6. A hand-operated device as defined in claim 1 wherein said centering and supporting pin is conically beveled at its extremity.

7. A hand-operated device as defined in claim 1 wherein securing means for preventing rotation of said cartridge are located at the opposite end of said cartridge from said centering and supporting pin.

8. A hand-operated device as defined in claim 1 wherein said feed reel and said wind-up reel define axial apertures and where said housing is provided with pivot pins conforming to said axial apertures in said reels, and where said reels are positioned in said cartridge with sufficient sideways play so that their exact position is determined when said cartridge is placed in said housing so that said pivot pins penetrate said axial apertures in said reels.

9. A hand-operated device as defined in claim 1 wherein said wind-up reel is provided with means for preventing undesired rotation in the direction counter to the wind-up direction.

10. A hand-operated device as defined in claim 9 wherein said means for preventing undesired rotation of said wind-up reel comprises radial teeth on said reel and a spring-like lip on said cartridge which engages said radial teeth so as to prevent rotation in the undesired direction.

11. A hand-operated device as defined in claim 1 wherein coupling means in said housing and outside of said cartridge are provided for coupling the rotational motion of said pivot pins.

12. A hand-operated device as defined by claim 11 where said coupling means are located in a covered space in said housing separated from the space in which said cartridge is situated.

13. A hand-operated device as defined by claim 1 wherein said housing comprises two parts which together constitute the side walls of said housing, where a pivot is provided at one end of said housing about which said parts are swivelable for the purpose of opening said housing to install or remove said cartridge, and where said housing has, built out from a wall facing said cartridge, said pivot pins, said centering and supporting pin, and said protrusion for preventing rotation about said centering and supporting pin.

14. A hand-operated device as defined by claim 13 wherein means are provided for securing in the closed position said parts of said housing.

15. A hand-operated device as defined by claim 14 wherein said securing means comprises a latching lever.

16. A hand-operated device as defined by claim 14 wherein said securing means comprises a swivelable latching lever.

17. A hand-operated device as defined by claim 1 wherein said cartridge has a means for blocking motion of said carrier tape, said blocking means being released from the blocking condition only when said cartridge is placed into said housing.

18. A hand-operated device as defined by claim 17 wherein said blocking means blocks said feed reel and said wind-up reel.

19. A hand-operated device as defined by claim 1 wherein said applicator member comprises a thin elongated elastic support member.

20. A hand-operated device as defined by claim 1 wherein said housing is configured to permit application of sufficient pressure on said tape and said substrate to cover indentations in said substrate caused by typewriting.

* * * * *